US009147345B2

(12) United States Patent
Agrait et al.

(10) Patent No.: US 9,147,345 B2
(45) Date of Patent: Sep. 29, 2015

(54) MOBILE PARKING ENFORCEMENT METHOD

(75) Inventors: Rebecca E. Agrait, San Francisco, CA (US); Erica C. Davis, San Francisco, CA (US); Tod A. Dykstra, San Francisco, CA (US); Jan M. Noworolski, Burlingame, CA (US); James E. Reich, San Francisco, CA (US); Peter K. Leiser, San Francisco, CA (US)

(73) Assignee: Streetline Inc., Foster City, CA (US)

( * ) Notice: Subject to any disclaimer, the term of this patent is extended or adjusted under 35 U.S.C. 154(b) by 71 days.

(21) Appl. No.: 13/068,366

(22) Filed: May 9, 2011

(65) Prior Publication Data

US 2011/0276370 A1 Nov. 10, 2011

Related U.S. Application Data

(60) Provisional application No. 61/395,137, filed on May 7, 2010.

(51) Int. Cl.

| | |
|---|---|
| ***G06F 17/00*** | (2006.01) |
| ***G06G 7/00*** | (2006.01) |
| ***G08G 1/14*** | (2006.01) |
| ***G07B 15/02*** | (2011.01) |
| ***G08G 1/137*** | (2006.01) |

(52) U.S. Cl.

CPC *G08G 1/14* (2013.01); *G07B 15/02* (2013.01); *G08G 1/137* (2013.01)

(58) Field of Classification Search

CPC ........... G08G 1/14; G08G 1/137; G07B 15/02
USPC ........................................................... 705/13
See application file for complete search history.

(56) References Cited

U.S. PATENT DOCUMENTS

| | | | | |
|---|---|---|---|---|
| 7,347,368 | B1 * | 3/2008 | Gravelle et al. | 235/384 |
| 7,617,120 | B2 * | 11/2009 | Derasmo et al. | 705/13 |
| 7,768,426 | B2 | 8/2010 | Groft | |
| 2002/0032601 | A1 * | 3/2002 | Admasu et al. | 705/13 |
| 2002/0190856 | A1 * | 12/2002 | Howard | 340/531 |
| 2003/0135407 | A1 * | 7/2003 | Reinhardt et al. | 705/13 |
| 2003/0179107 | A1 * | 9/2003 | Kibria et al. | 340/932.2 |
| 2006/0059037 | A1 * | 3/2006 | Ivey et al. | 705/13 |
| 2007/0050240 | A1 * | 3/2007 | Belani et al. | 705/13 |
| 2008/0021770 | A1 * | 1/2008 | Mourton et al. | 705/13 |
| 2009/0024430 | A1 * | 1/2009 | Marcus | 705/7 |

(Continued)

*Primary Examiner* — Allen J Jung
(74) *Attorney, Agent, or Firm* — LUMEN PATENT FIRM

(57) ABSTRACT

A real-time wireless parking enforcement system is provided that includes a remote parking enforcement system having a plurality of parking sensors disposed to gather parking occupancy data and at least one source of parking payment data, where the parking occupancy data and parking payment data is communicated to a central server in real-time, and a plurality of wireless mobile platforms are operated by a plurality of parking enforcement officers (PEO's). The wireless mobile platforms send and receive real-time and continuous parking occupancy data and parking payment data to and from the central server, where bidirectional communication exists between the central server and the wireless mobile platforms. When the PEO enters response information to a potential violation to the wireless mobile platform, the bidirectional communication updates the status of the potential violation to all the wireless platforms in real-time, where the information is used to reduce enforcement redundancies by the PEO's.

20 Claims, 5 Drawing Sheets

(a) (b)

(56) References Cited

U.S. PATENT DOCUMENTS

2009/0173552 A1* 7/2009 Elder et al. ................ 178/18.03
2009/0267732 A1* 10/2009 Chauvin et al. ............. 340/5.53
2010/0274816 A1* 10/2010 Guzik .......................... 707/802
2011/0093314 A1* 4/2011 Redmann et al. .............. 705/13
2011/0131083 A1* 6/2011 Redmann et al. .............. 705/13
2012/0109721 A1* 5/2012 Cebon et al. ................... 705/13

* cited by examiner (a)

(a)

(b)

(c)

MOBILE PARKING ENFORCEMENT METHOD

CROSS-REFERENCE TO RELATED APPLICATIONS

This application claims priority from U.S. Provisional Patent Application 61/395,137 filed May 7, 2010, which is incorporated herein by reference.

FIELD OF THE INVENTION

The present invention relates generally to parking enforcement. More particularly, the invention relates to a method of efficient wireless mobile parking meter enforcement.

BACKGROUND OF THE INVENTION

Presently, parking enforcement lacks a way to identify parking spaces where a high-density of parking violators exists at any specific moment. Further, there is a need for deploying enforcement personnel with increased efficiency while avoiding conflicts where multiple officers attempt to cite vehicles already cited or determined to be legally parked by other officers.

SUMMARY OF THE INVENTION

To address the needs in the art, a real-time wireless parking enforcement system is provided that includes a remote parking enforcement system having a plurality of parking sensors disposed to gather parking occupancy data and at least one source of parking payment data, where the parking occupancy data and parking payment data is communicated to a central server in real-time, and a plurality of wireless mobile platforms operated by a plurality of parking enforcement officers (PEO's), where the wireless mobile platforms send and receive real-time and continuous parking occupancy data and parking payment data to and from the central server, where bidirectional communication exists between the central server and the wireless mobile platforms, where when the PEO enters response information to a potential violation to the wireless mobile platform, the bidirectional communication updates the status of the potential violation to all the wireless platforms in real-time, where the real-time continuous information is used to reduce parking enforcement redundancies by the PEO's.

According to one aspect of the invention, additional sensors in the system are further disposed to gather and communicate traffic speeds and vehicle counts to the central server.

In another aspect of the invention, the wireless mobile platforms are integrated with a ticket issuance machine.

In a further aspect of the invention, each change in the occupancy data is sent to the central server as soon as the information becomes available along with the time when the occupancy data change occurred.

In yet another aspect of the invention, the parking occupancy data is a state of individual parking spaces that can include sensor outage, possible vehicle departure, possible vehicle arrival, definite vehicle departure, definite vehicle arrival, sensor delay, occupied parking space, vacant parking space, or indeterminate condition of parking space.

According to another aspect of the invention, the parking payment data includes the quantity of payment for a corresponding individual space, where the parking payment data is sent to the central server by devices that can include the sensor disposed on a single or multi-space meter, a server connected to the meter, a pay-by-cell system, or entered into the system by a human attendant.

In one aspect of the invention, the payment data further includes the remaining time before the current vehicle parked in the parking space becomes a violation.

In a further aspect of the invention, the payment data further includes the policy in effect for the vehicle currently parked in the parking space, where the policy in effect includes information as to whether a vehicle is subject to an exempt or reduced rate payment structure, where the exemption includes a handicapped placard or a city vehicle.

In yet another aspect of the invention, the payment data further includes a broken meter status, a jammed meter status, no communication meter status, expired meter status, paid meter status, meter under maintenance status, or unable to accept payment meter status.

According to another aspect of the invention, a paid status is determined based on an in-car wireless mobile platform, where the paid status is entered into the wireless mobile platform by the PEO.

According to a further aspect of the invention, the central server sends information to each wireless mobile platform, where the information can include the current locations of one or more other wireless mobile platforms, the information from prior wireless mobile platform observations at given locations, parking policy information, historical parking trends, distance from the wireless mobile platform location to likely violations, predicted travel time from the wireless mobile platform location to likely violations, and providing the wireless mobile platform with views of locations which have a high likelihood of being ticketable violations.

In yet another aspect of the invention, the parking occupancy data and parking payment data further includes guidance information to the PEO for a maximization of citation revenue or other enforcement objectives, where the guidance information can include occupancy levels, occupancy of particular space types, demand for parking spaces in a region, or street traffic in surrounding areas of the parking space.

According to one aspect of the invention, a performance metric is provided to PEO management from the central server, where the performance metric includes a number of tickets written per hour, a total number of tickets written, a percentage of violations visited, or average time between violation and an officer action.

In a further aspect of the invention, the parking payment data further includes an expiration time of payment, or an open-ended payment that includes a user paying for a duration of use of a parking space, where the paying of the duration of use concludes once a time limit is reached or when the user manually terminates the payment.

According to another aspect of the invention, the wireless mobile platform displays removed potential violations, where the potential violations are removed either when the violating vehicle leaves the space or the violation is market by the PEO, where the potential violation includes expired meters, exceeding a time limit for a time-limited parking space, or parking in no parking zone.

In a further aspect of the invention, the status of the potential violation can include the time of visit by the PEO, issuance of a citation, physical verification of whether a car is present and a space is unpaid, presence of exempting permit or placard, and a reason for the PEO not to issue a citation.

According to another aspect of the invention, a user interface of the wireless mobile platform includes a two-level user display, where a first level includes a map disposed to present view of all blocks or sides of blocks in an area showing the value of each based on the current number and seriousness of the potential violations, or on an estimate of the, number and seriousness of actual violations based on the historical breakdown of actual vs. potential violations for that block or or side of the block. The first level provides for selection of a block or side of the block, resulting in the transition to a second level display for that block or side of the block. The second level display includes specific locations of the potential violations along the length of each side the block view, where the PEO updates the potential violation status for each the potential violation. In some embodiments of the invention, the two-level display provides an interface to access to a ticket issuance application and pre-populate data on the violation based on location and PEO input.

In another aspect of the invention, the wireless mobile platform includes an interface allowing the PEO to coordinate their actions by displaying the locations of other the PEO's in real-time, where the PEO enters their upcoming action plan for display to other PEO's, where the entered upcoming action plan includes a short-term route plan, where the short-term route plan is entered via finger or stylus motions on a touchscreen by the PEO.

DETAILED DESCRIPTION

Figure 1:
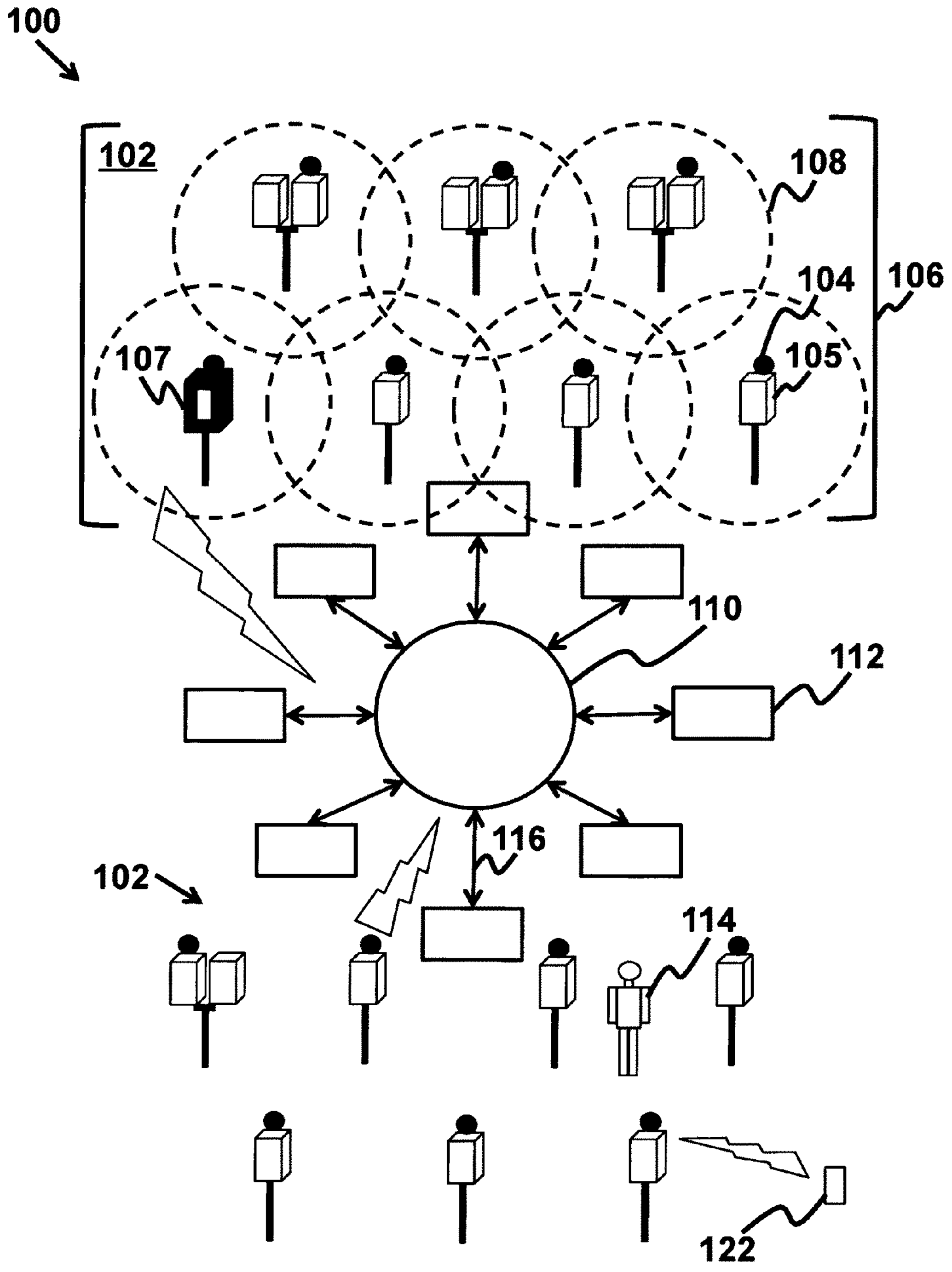
FIGS. 1*a*-1*b* show schematic drawings of the real-time wireless mobile platforms and central server updating when a parking status changes, according to one embodiment of the invention.
Figure 1:
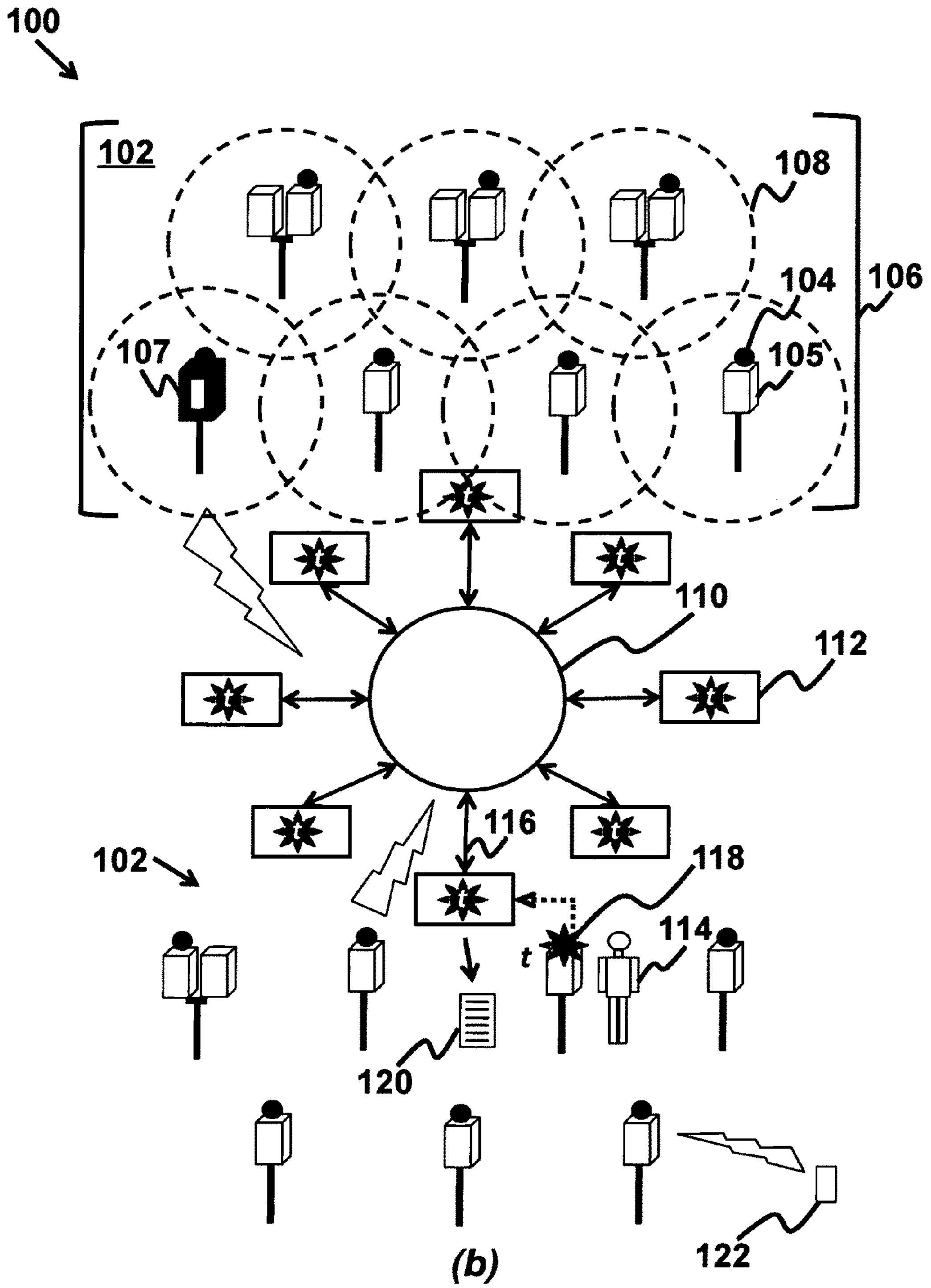

The current invention provides a real-time wireless parking enforcement system that utilizes parking occupancy, parking payment data, and wireless mobile platforms to provide real-time, continuous information flow to management and parking enforcement officers (PEO) resulting in improved operational efficiency and increased quantity and fairness of citation issuance.

According to one embodiment of the invention, real-time information flows from the remote parking meter monitoring and payment reporting system, and a plurality of wireless mobile platforms to a central server and archive engine used to collect and archive the collected information. The central server and archive engine component collects, processes, and archives the information provided by the system subcomponents. It also supports reporting, querying and optimization of enforcement workforce by supervisors based on historical information as well as supporting real-time monitoring and direction of the workforce.

Optionally, additional information, such as traffic speeds and vehicle counts, flows into the central server and archive engine as well. In yet another aspect of the invention, the parking occupancy data and parking payment data further includes guidance information to the PEO for a maximization of citation revenue, where the guidance information can includes occupancy levels, demand for parking spaces in a region, or street traffic in surrounding areas of the parking space.

In one aspect, parking enforcement officers (PEO's) access the display and deployment engine from their wireless mobile terminals. The wireless mobile terminals may be further integrated in some manner with a ticket issuance system and touchscreen operation.

According to one embodiment, the real-time wireless parking enforcement system provides real-time information about the state of individual spaces that are being managed by the overall system. Each state change is reported, either by the sensor or by a PEO as soon as the information becomes available along with the time when the state change occurred. States that are reported may include sensor outage, possible departure, possible arrival, definite departure, definite arrival, sensor delay, occupied, vacant, and/or indeterminate.

In a further aspect of the invention, the payment reporting system provides real-time information relating to the payment for parking spaces managed by the system that can include the quantity of payment or payment and expiration times for the corresponding individual spaces that are being managed by the system, where the payment may be provided by a single or multi-space meter, by a server connected to one or more meters, by a pay-by-cell system, or may be entered into the system by the PEO. The information relating to the payment for parking spaces managed by the system can also include the remaining time before the current vehicle parked in the space becomes a violation, and the policy in effect for the vehicle currently parked in the space such as whether the vehicle is claimed to be subject to any sort of exempt or reduced rate payment structure (for example, handicapped placards, or city vehicles). The information relating to the payment for parking spaces managed by the system can also include accurately time-stamped changes in status of the meters or payment systems for individual spaces under management. Such status information may include broken meter, jammed meter, no communication from the meter, expired meter, paid meter, meter under maintenance, or meter unable to accept payment.

The wireless mobile platforms collect and process data that includes the information from the central server and archive engine, the current locations of one or more wireless mobile platforms (if available), the information from prior wireless mobile platforms data inputs (observations) at given locations, as entered by the PEO, or inferred from PEO actions and locations, parking policy information, historical parking trends, distance and or travel time from the current PEO locations to likely violations and presenting the end-user PEO with views of locations which have a high likelihood of being ticketable violations. The wireless mobile platforms may further accept and archive one or more of user actions or user location in the central DB store.

In a further aspect of the invention, the status of the potential violation can include the time of visit by the PEO, issuance of a citation, physical verification of whether a car is present and a space is unpaid, presence of exempting permit or placard, and a reason for the PEO not to issue a citation.

Other presentations of data by the wireless mobile platforms may also be based on or include a maximization of citation revenue, occupancy levels and demand for spaces in a region, street traffic in surrounding areas, other wireless mobile platforms locations or actions, availability of limited resources, such as handicap spaces, or other goals set by the supervisor. According to other embodiments, further presentations of data by the wireless mobile platforms can include predicted or user-specified locations and/or user-specified or inferred next destinations for other users of the system, a performance metric, for example the number of tickets written per hour, total number of tickets written, percentage of violations visited, or average time between violation and officer actions. In a further embodiment, additional presentations of data by the wireless mobile platforms include space, block, block face, or zone or district level violation counts or heat-maps, dynamic targeting policy such as using historical data to increase the probability of citing handicap violators, fraud likelihood indication, or proper functioning of parking meter(s) for that space.

In a further embodiment of the invention, referencing communication of state or status can include communication of state changes, or periodic communication of the current state.

Referring now to the figures, FIGS. 1*a*-1*b* show schematic drawings of the a real-time wireless parking enforcement system 100, which includes remote parking meter monitoring system 102 having a plurality of parking sensors 104 disposed to gather parking occupancy data and parking payment data.

In one embodiment, the remote parking meter monitoring system 102 can include a multi-hopping grid mesh network 106 having a meter-based server 107 connected to one or more meters, where each parking sensor 104 is integrated to the parking meter 105 and has a communication region 108, where the communication region 108 includes a distance of at least to one adjacent parking sensor 104 for low-power operation. As shown, the communication regions 108 can be in communication with multiple parking sensors 104, allowing for many possible paths for the information to route through the mesh network 106. Here, the meter-based server 107 communicates the parking occupancy data and parking payment data to a central server 110 in real-time.

In another embodiment of the invention, the remote parking meter monitoring system 102 includes each parking sensor 104 integrated to the parking meter 105, where the parking sensor 104 communicates the parking occupancy data and parking payment data to a central server 110 in real-time.

According to the invention, a plurality of wireless mobile platforms 112 are operated by a plurality of parking enforcement officers (PEO's) 114, where the wireless mobile platforms 112 send and receive (bidirectional) real-time and continuous parking occupancy data 116 and parking payment data to and from the central server 110, where bidirectional communication exists between the central server 110 and the wireless mobile platforms 112, and where when the PEO 114 enters potential violation response status information to the wireless mobile platforms 112, the bidirectional communication 116 updates the status of the potential violation to all the wireless platforms 112 in real-time, where the real-time continuous information is used to reduce parking enforcement redundancies by the PEO's 114.

FIG. 1*b* shows a schematic drawings of the a real-time wireless parking enforcement system 100, having the remote parking meter monitoring system 102 having a plurality of parking sensors 104 disposed to gather parking occupancy data and parking payment data, where each change in the occupancy data 118 (state change) is input to the wireless mobile platform 112 and sent to the central server 110, then further communicated to all other wireless mobile platforms 112 in real-time. According to one embodiment, the state change 118 is provided along with the time (t) when the occupancy data change 118 occurs. Further shown is another embodiment, where the wireless mobile platforms 112 are integrated with a ticket-printing machine 120. In cases where the PEO 114 specifies an action in a particular space, the space may be taken off of the list of all other users of the system and may remain off the list until another potential violation occurs in that space.

In one embodiment, a pay-by-cell system 122 is provided, where a driver may establish contact with the parking sensor 104 or the central server 110 and communicate payment using their cell phone 122.

According to another aspect of the invention, a user interface of the wireless mobile platform includes a two-level user display, where a first level includes a map disposed to nearby blocks or sides of blocks with scores provided for each based either on an estimated number of actual violations based on current violation levels and historical norms, or the current number of potential violations on the block. This first level allows selection of a block or side of a block which initiates second level includes specific locations of the potential violations along the length of each side the block view, where the PEO updates the potential violation status for each the potential violation. Here, the two-level display may provide an interface to access to a ticket issuance application.

In another aspect of the invention, the wireless mobile platform includes an interface allowing a plurality of PEOs to coordinate their actions by displaying the locations of other nearby PEO's in real-time, where the PEO enters their upcoming action plan for display to other PEO's, where the entered upcoming action plan includes a short-term route plan, where the short-term route plan is entered via finger or stylus motions on a touchscreen by the PEO.

Figure 2:
FIGS. 2*a*-2*c* show interfaces of real-time mobile platforms having city block views, expected violation location views and the current state of violations, respectively, according to one embodiment of the invention.
Figure 2:
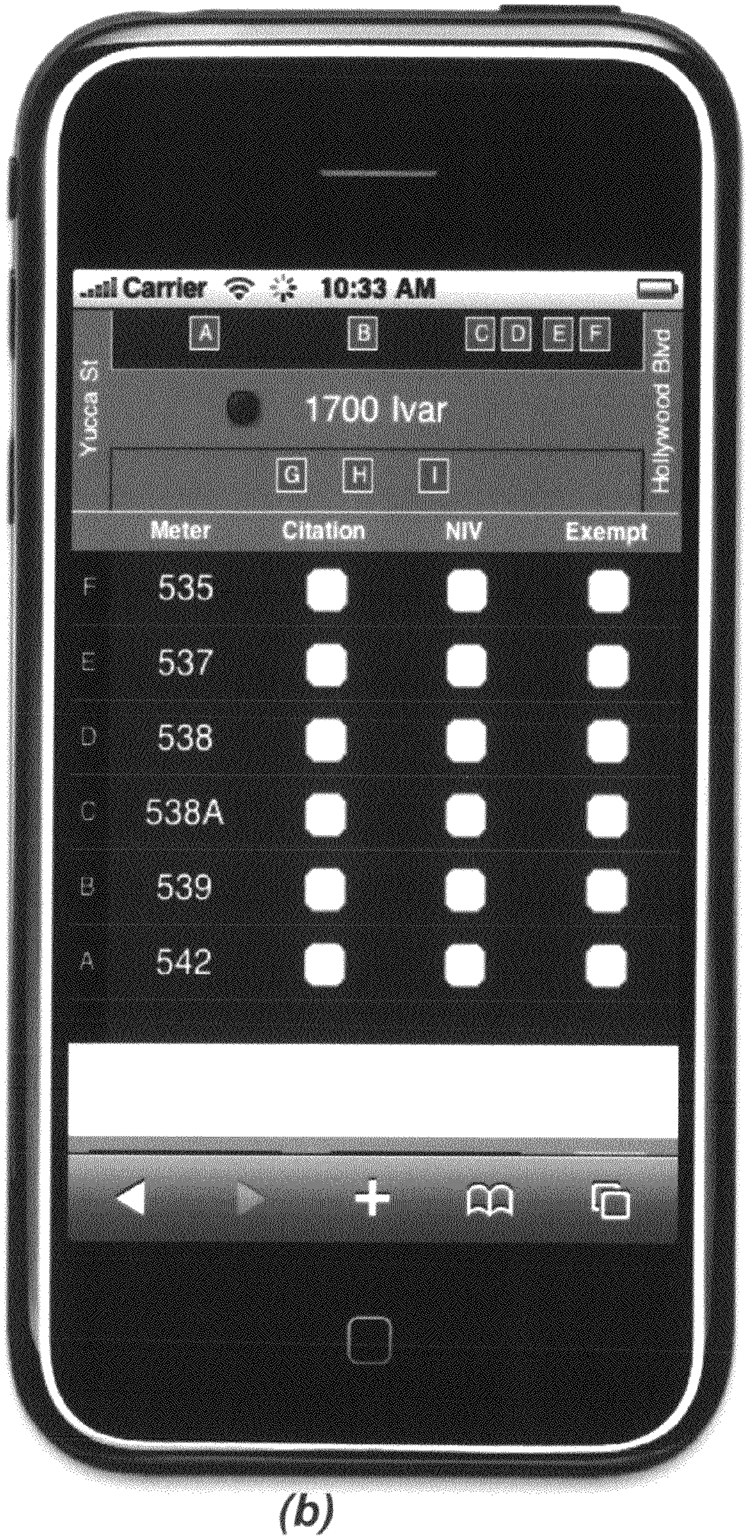
Figure 2:

The real-time display may include an overall regional summary view, a block level view, and action views as shown in FIGS. 2*a*-2*c*. FIG. 2*a* shows the summary screen or block level view 200, which may indicate the location of other wireless mobile platforms 112 as well as their expected locations based on the PEO 114 actions, entries, or the current state of violations in the system area or user specified intentions. In one embodiment of the invention, the block level view 200 may indicate the number of potential violations detected in a particular area, the number of actual violations predicted to be present in the area based on historical ratios of potential to actual violations based on historical data, time of day, day of week, date and sensed quantities such as occupancy level and demand. In one embodiment of the invention, the block level view 200 may designate a "point value" for each block based on the seriousness or duration of violations, violation type, availability of spaces, special function of particular blocks, presence of handicap spaces, or custom values based on overall enforcement goals or specified by a supervisor.

In a further embodiment of the invention, the summary screen or block view 200 may additionally specify the locations of violations within a blockface or block, allowing the violations to be easily found without the PEO having to examine individual parking meters likely to not be in violation. One embodiment provides an entry area for PEO actions to be entered. These actions may include:

- Various types of violation cited (e.g. expired meter, over limit, red zone, fire hydrant, loading zone violations, etc.)
- Citation already placed on vehicle
- Exempt from parking rules due to permits (e.g. handicap, city vehicle, residential)
- Not in violation due to sensor or payment information error, change in parking policy, driveaways
- Space paid (i.e. payment receipt on dash or in-car metering device)
- Meter broken (this information may be provided to the meter repair shop)
- Snooze violation, marking it for revisit in a specified amount of time In a further embodiment, the block view 200 screen may include specific information about each violation, such as the history of payment, time of stay, and type of violation.

In a further embodiment, suitable for parking configurations with non-delineated spaces, the block view screen 200 may include heat maps, graduated levels, or other visual displays representative of the likelihood of violations on the block.

Additional embodiments of this system may be specialized to particular tasks, such as supporting citations for street-cleaning activity, collecting information on handicapped placards or to support tire chalking for time limit enforcement. Further embodiments can include an ability to call for assistance from the wireless mobile platform, an egression indication per-space measurement capacity, providing dynamic grace periods, and establishing per-space policy grace periods. Other embodiments of the invention can provide fraud detection that include coin rejections or jams after parking, placard fraud prevention by listing all placard locations in a region.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art.

All such variations are considered to be within the scope and spirit of the present invention as defined by the following claims and their legal equivalents.

What is claimed:

1. A real-time wireless parking enforcement system, comprising:

a) a parking sensor integrated to a parking meter, wherein said parking sensor is disposed to continuously sense for parking occupancy state change data of a parking space in real-time, wherein said parking meter is disposed to continuously sense for parking payment data in real-time, wherein said parking occupancy state change data and parking payment data are continuously communicated to a central server in real-time, wherein said central server is capable of making violation estimates; and b) a plurality of wireless mobile platforms operated by a plurality of parking enforcement officers (PEO's), wherein said violation estimates are determined by said server that is in continuous communication with said parking sensor that is continuously providing said state change data and that is in continuous communication with said parking meter or another server that is continuously providing said parking payment data in real-time, wherein said wireless mobile platforms send and receive real-time and continuous said estimated violation data and response information from said PEO's to and from said central server, wherein bidirectional communication exists between said central server and said wireless mobile platforms, wherein when said PEO enters response information related to a potential violation to said wireless mobile platform, said bidirectional communication updates said status of said potential violation to all said wireless platforms in real-time, wherein a user interface of said wireless mobile platform generates a map displaying nearby blocks of said potential violation, wherein said map displays estimated violation scores for each said nearby block, wherein said map provides an option for selecting at least one block or a portion of said block, wherein said user interface further generates for display specific locations of said potential violations along a selected block or said portion of said block are displayed, wherein said PEO updates said potential violation status for each said potential violation, wherein all said wireless mobile platforms of said PEO's display said updated status showing said potential violation as attended to by at least one of said PEO's, wherein said real-time continuous information is used to reduce parking enforcement redundancies by said PEO's, wherein said PEO issues a citation according to a violation.

2. The real-time wireless parking enforcement system of claim 1, wherein another said sensor is provided which gathers and communicates traffic speeds and vehicle counts to said central server.

3. The real-time wireless parking enforcement system of claim 1, wherein said wireless mobile platforms are integrated with a ticket issuance system.

4. The real-time wireless parking enforcement system of claim 1, wherein each change in said occupancy data is sent to said central server as soon as the information becomes available along with the time when said occupancy data change occurred.

5. The real-time wireless parking enforcement system of claim 1, wherein said parking occupancy data is a state of individual parking spaces selected from the group consisting of sensor outage, possible vehicle departure, possible vehicle arrival, definite vehicle departure, definite vehicle arrival, sensor delay, occupied parking space, vacant parking space, and indeterminate condition of parking space.

6. The real-time wireless parking enforcement system of claim 1, wherein said parking payment data comprises the quantity of payment for a corresponding individual space, wherein said parking payment data is sent to said central server by devices selected from the group consisting of said sensor disposed on a single or multi-space meter, a server connected to said meter, and a pay-by-cell system, or entered into the system by a human attendant.

7. The real-time wireless parking enforcement system of claim 1, wherein said occupancy data further comprises the remaining time before the current vehicle parked in said parking space becomes a violation.

8. The real-time wireless parking enforcement system of claim 1, wherein said payment data further comprises the policy in effect for the vehicle currently parked in said parking space, wherein said policy in effect comprises information as to whether a vehicle is subject to an exempt or reduced rate payment structure, wherein said exemption comprises a handicapped placard or a city vehicle.

9. The real-time wireless parking enforcement system of claim 1, wherein said payment data further comprises a broken meter status, a jammed meter status, no communication meter status, expired meter status, paid meter status, meter under maintenance status, or unable to accept payment meter status.

10. The real-time wireless parking enforcement system of claim 1, wherein a paid status is determined based on an in-car said wireless mobile platform, wherein said paid status is entered into said wireless mobile platform by said PEO.

11. The real-time wireless parking enforcement system of claim 1, wherein said central server sends information to each said wireless mobile platform, wherein said information is selected from the group consisting of the current locations of one or more other said wireless mobile platform, the information from prior said wireless mobile platform observations at given locations, parking policy information, historical parking trends, distance from said PEO's wireless mobile platform location to likely violations, travel time from said PEO's wireless mobile platform location to likely violations, and providing said PEO's wireless mobile platform with views of locations which have a high likelihood of being ticketable violations.

12. The real-time wireless parking enforcement system of claim 1, wherein said parking occupancy data and parking payment data further comprises guidance information to said PEO for a maximization of citation revenue, wherein said guidance information is selected from the group consisting of occupancy levels, demand for parking spaces in a region, and street traffic in surrounding areas of said parking space.

13. The real-time wireless parking enforcement system of claim 1, a performance metric is provided to PEO management from said central server, wherein said performance metric comprises a number of tickets written per hour, a total number of tickets written, a percentage of violations visited, or average time between violation and an officer action.

14. The real-time wireless parking enforcement system of claim 1, wherein said parking payment data further comprises an expiration time of payment, or an open-ended payment comprising a user paying for a duration of use of a parking space, wherein said paying of said duration of use concludes once a time limit is reached or when said user manually terminates said payment.

15. The real-time wireless parking enforcement system of claim 1, wherein said wireless mobile platform displays removed said potential violations, wherein said potential violations are removed either when the violating vehicle leaves the space or the violation is marked by said PEO, wherein said potential violation comprises expired meters, exceeding a time limit for a time-limited parking space, or parking in no parking zone.

16. The real-time wireless parking enforcement system of claim 1, wherein said status of said potential violation is selected from the group consisting of a time of visit by said PEO, issuance of a citation, physical verification of whether a car is present and a space is unpaid, presence of exempting permit or placard, and a reason for said PEO not to issue said citation.

17. The real-time wireless parking enforcement system of claim 1, wherein a user interface of said wireless mobile platform comprises said map disposed to present a view of all blocks or sides of blocks within an area, displaying for each said user either an estimated number of actual violations based on the current number of violations and historical norms, or the current number of potential violations on said block, wherein said user interface display the selected block or side of a block, and comprises specific locations of said potential violations along the length of each side said block view, wherein said PEO updates said potential violation status for each said potential violation.

18. The real-time wireless parking enforcement system of claim 17, wherein said user interface provides access to a ticket issuance application.

19. The real-time wireless parking enforcement system of claim 1, wherein said wireless mobile platform comprises said user interface that allows said PEO to coordinate their actions by displaying the locations of other said PEO's in real-time, wherein said PEO enters their upcoming action plan for display to other said PEO's, wherein said entered upcoming action plan comprise a short-term route plan, wherein said short-term route plan is entered via finger or stylus motions on a touchscreen by said PEO.

20. The real-time wireless parking enforcement system of claim 1, wherein said violation score is based on parameters selected from the group consisting of an estimated number of actual violations, current violation levels, historical norms, and a current number of potential violations.

* * * * *